United States Patent
Hemmati et al.

(10) Patent No.: US 12,110,017 B2
(45) Date of Patent: Oct. 8, 2024

(54) STREET LANE-LEVEL MATCHING METHOD FOR AUTOMOTIVE APPLICATIONS

(71) Applicant: FORD GLOBAL TECHNOLOGIES, LLC, Dearborn, MI (US)

(72) Inventors: Rahi Hemmati, North York (CA); Hamed Asadi, Troy, MI (US); Azin Neishaboori, Plymouth, MI (US); Mohsen Bahrami, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 268 days.

(21) Appl. No.: 17/684,241

(22) Filed: Mar. 1, 2022

(65) Prior Publication Data
US 2023/0278554 A1 Sep. 7, 2023

(51) Int. Cl.
*B60W 30/12* (2020.01)
*B60W 40/105* (2012.01)

(52) U.S. Cl.
CPC .......... *B60W 30/12* (2013.01); *B60W 40/105* (2013.01); *B60W 2552/10* (2020.02); *B60W 2552/53* (2020.02)

(58) Field of Classification Search
CPC ............... B60W 40/105; B60W 40/00; B60W 30/0956; B60W 30/18163; G06V 20/588; G06V 20/58; G01S 13/931
See application file for complete search history.

(56) References Cited

U.S. PATENT DOCUMENTS

| 9,428,187 B2 | 8/2016 | Lee |
| 11,105,637 B2 | 8/2021 | Loomis |
| 2011/0313665 A1* | 12/2011 | Lueke ................... G01S 13/931 |
| | | 701/301 |
| 2016/0185388 A1* | 6/2016 | Sim ........................ G06V 20/58 |
| | | 701/41 |

(Continued)

FOREIGN PATENT DOCUMENTS

KR  102134841 B1  3/2020

OTHER PUBLICATIONS

Kang et al., Lane-Level Map-Matching Method for Vehicle Localization Using GPS and Camera on a High-Definition Map, Sensors 2020, 20, 2166.

(Continued)

*Primary Examiner* — Yuri Kan
(74) *Attorney, Agent, or Firm* — Joseph Zane; Brooks Kushman P.C.

(57) ABSTRACT

Lane-level matching is provided. For a time index of a time slot of a period of receiving consecutive position information, a lateral distance of the vehicle to each of a plurality of lanes of a roadway is calculated using data from sensors of a vehicle. For each lane of the plurality of lanes, a positional uncertainty of the vehicle in an orthogonal direction to a lane bearing of the lane is calculated, a lane confidence based on an average of confidence values of the lane over the period of receiving consecutive position information is calculated, and a lane probability based on the lane confidence is calculated. For the time index, it is identified which of the lanes has a highest probability as being the lane to which the vehicle is matched.

26 Claims, 11 Drawing Sheets

(56) References Cited

U.S. PATENT DOCUMENTS

2017/0329328 A1\* 11/2017 Horita .................. B60W 40/00
2018/0251129 A1\* 9/2018 Ji ..................... B60W 30/18163
2019/0108754 A1\* 4/2019 Baek ................ B60W 30/0956
2022/0169281 A1\* 6/2022 Lin ...................... G06V 20/588

OTHER PUBLICATIONS

Riorda, Lane Detection Algorithm for Automotive Applications, Implementation of a GOLD-Based Machine Vision Algorithm on a High-Performance System on Chip, Master Degree Thesis, Politecnico di Torino, Jul. 2020.

\* cited by examiner

STREET LANE-LEVEL MATCHING METHOD FOR AUTOMOTIVE APPLICATIONS

TECHNICAL FIELD

Aspects of the present disclosure generally relate to lane-level matching for a variety of automotive applications, e.g., localization, traffic light classification (TLC) and remote driving.

BACKGROUND

Accurate vehicle localization is useful for intelligent transportation systems and autonomous vehicles. However, it may be difficult to achieve localization accuracy for vehicles due to various factors.

SUMMARY

In one or more illustrative examples, a system for lane-level matching is provided. The system includes a computing device programmed to calculate, for a time index of a time slot of a period of receiving consecutive position information, using data from sensors of a vehicle, a lateral distance of the vehicle to each of a plurality of lanes of a roadway. For each lane of the plurality of lanes, the computing device is programmed to calculate a positional uncertainty of the vehicle in an orthogonal direction to a lane bearing of the lane, calculate a lane confidence based on an average of confidence values of the lane over the period of receiving the consecutive position information, and calculate a lane probability based on the lane confidence. The computing device is further programmed to identify, for the time index, which of the lanes has a highest probability as being the lane to which the vehicle is matched.

In one or more illustrative examples, a method for lane-level matching is provided. For a time index of a time slot of a period of receiving consecutive position information, a lateral distance of the vehicle to each of a plurality of lanes of a roadway is calculated using data from sensors of a vehicle. For each lane of the plurality of lanes, a positional uncertainty of the vehicle in an orthogonal direction to a lane bearing of the lane is calculated, a lane confidence based on an average of confidence values of the lane over the period of receiving consecutive position information is calculated, and a lane probability based on the lane confidence is calculated. For the time index, it is identified which of the lanes has a highest probability as being the lane to which the vehicle is matched.

In one or more illustrative examples, a non-transitory computer-readable medium includes instructions for lane-level matching that, when executed by a computing device, cause the computing device to perform operations including to calculate, for a time index of a time slot of a period of receiving consecutive position information, using data from sensors of a vehicle, a lateral distance of the vehicle to each of a plurality of lanes of a roadway, for each lane of the plurality of lanes calculate a positional uncertainty of the vehicle in an orthogonal direction to a lane bearing of the lane, calculate a lane confidence based on an average of confidence values of the lane over the period of receiving consecutive position information, and calculate a lane probability based on the lane confidence, and identify, for the time index, which of the lanes has a highest probability as being the lane to which the vehicle is matched.

DETAILED DESCRIPTION

Figure 1:
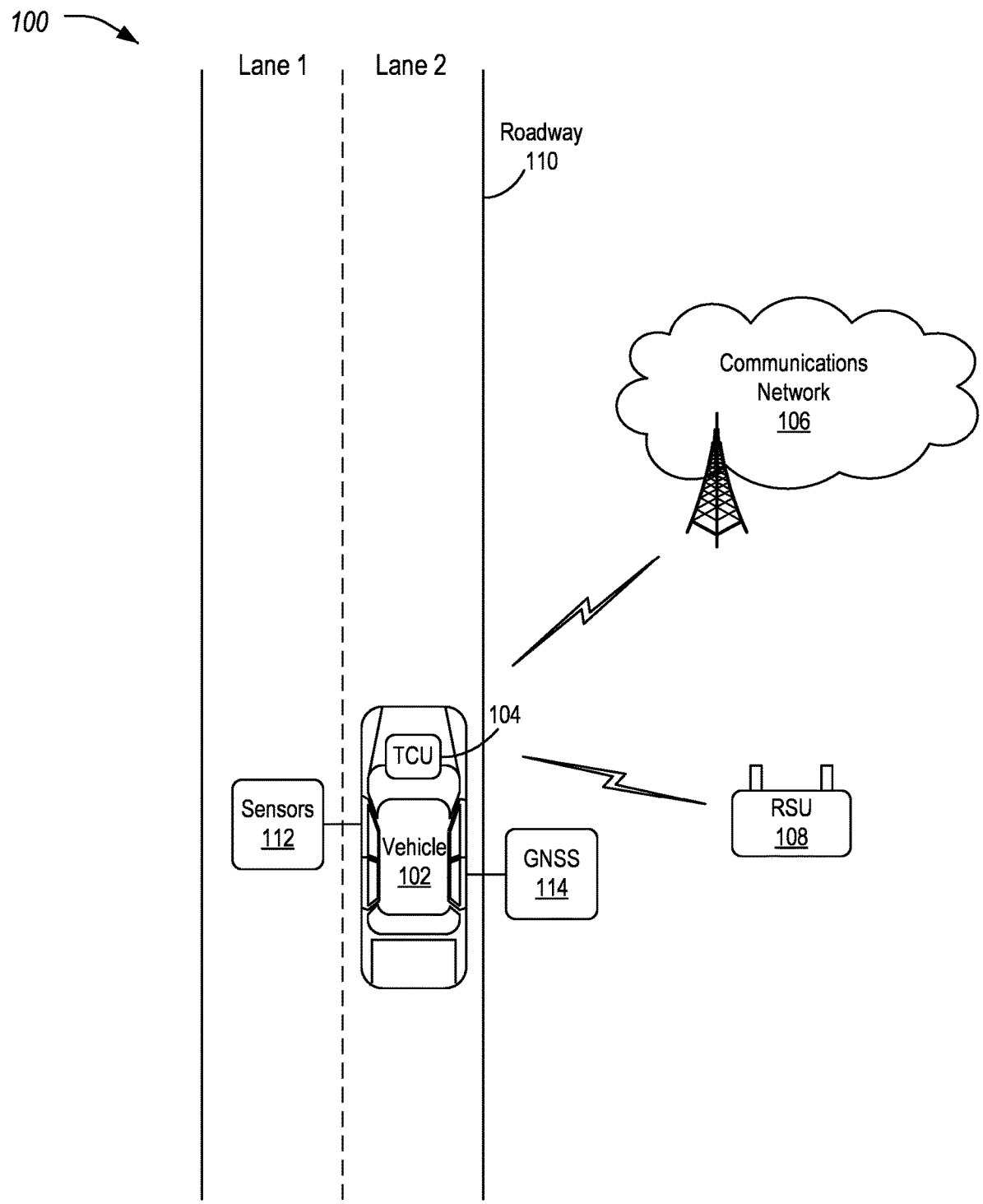
FIG. 1 illustrates an example vehicle for use in lane-level matching applications.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

A trustable localization may be required for many modern vehicle applications such as advanced driver assistant system (ADAS) and autonomous driving. Further, ADAS system may also consume cellular vehicle to everything (CV2X) and/or Dedicated Short Range Communications (DSRC) and/or Multi-Access Edge Computing (MEC) through a cellular communications link data such as traffic signal state and time information for which accurate lane-level positioning is desirable. For an accurate position determination, a vehicle may use different sensors of which a global navigation satellite system (GNSS) may provide absolute position of the vehicle in a global coordination system. This may be complemented by a dead reckoning system that uses sensors such as an inertial measurement unit (IMU) and wheel speed sensor for estimation of the vehicle displacement. Considering that the GNSS position may be prone to uncertainties such as number of satellites in view and varying ambient conditions, the estimated position with and without dead reckoning may not provide lane-level accuracy on many occasions. Note that in this context lane-level matching means matching the position of the vehicle to one of the lanes in the road. As discussed in further detail herein, aspects of the disclosure use the history of lane matching, vehicle speed and heading to decrease the uncertainties of position estimation reach lane-level matching with higher certainty.

A vehicle may potentially use more than one GNSS. Fusing information from more than one GNSS may improve accuracy of positioning system and eventually the performance of the system for lane level matching.

The disclosed approach utilizes information from different sensors available to a vehicle. This includes position, speed and angular speed sensor data. The approach also uses the vehicle speed and heading (yaw angle) information to estimate location of the vehicle from one position report to the next position report.

To take the vehicle's maneuver into account from one position report to the next position report, the confidence for lane matching is calculated by averaging the confidence over an estimated (projected) position of the vehicle. The reason is from one position report to the next position report, the lane can be changed if the vehicle's heading is toward one of right or left lanes. To avoid this issue, based on current position and vehicle's heading, the vehicle's position is anticipated over several selected instances before receiving the next position update. Averaging the confidence over selected instance can improve the lane matching confidence estimation and avoid delays in lane matching due to less frequent position updates.

The approach may also use a probabilistic framework to take position uncertainties into account. A probabilistic framework assigns a probability to each lane. For each lane this probability may refer to the probability that the vehicle is within the lane. A lane matching history of the vehicle may be used for future lane-matching decisions.

An adaptive approach may also be provided to further enhance the lane matching algorithm by detecting lane change in case the wheels are steered toward left or right consistently, i.e., yaw rate toward left or right is greater than a predetermined threshold, and update lane confidence for left and right lanes accordingly. This approach also can decrease delays in detection of lane change using noisy position data. Further aspects of the disclosed approach are discussed in detail herein.

FIG. 1 illustrates an example system 100 including a vehicle 102 for use in performing a lane-level matching algorithm. As shown, the vehicle 102 may include a telematics control unit (TCU) 104 and may be configured to travel along a roadway 110. Using the TCU 104, the vehicle 102 may communicate with a roadside unit (RSU) 108 over a broadcast peer-to-peer protocol (such as PC5), and/or with a communications network 106 over a cellular or other wireless protocol. The RSU 108 may be equipped by CV2X and/or DSRC transceivers and the communications network 106 may equipped with MEC to receive and share map and traffic signal information. It should be noted that the system 100 shown in FIG. 1 is merely an example, and systems having more, fewer, and different arrangements of elements may be used. For instance, while only one vehicle 102 along one roadway 110 is shown, it is contemplated that system 100 would include many vehicles 102 and roadways 110 to traverse.

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN). The vehicle 102 may also be associated with a governmental registration, such as a license plate number.

The TCU 104 may be configured to provide telematics services to the vehicle 102. These services may include, as some non-limiting possibilities, navigation, turn-by-turn directions, vehicle health reports, local business search, accident reporting, and hands-free calling. The TCU 104 may accordingly be configured to communicate over various protocols, such as with a communications network 106 over a network protocol (such as Uu). The TCU 104 may, additionally, be configured to communicate over a broadcast peer-to-peer protocol (such as PC5), to facilitate cellular vehicle-to-everything (C-V2X) communications with devices such as the RSU 108. It should be noted that these protocols are merely examples, and different peer-to-peer and/or cellular technologies may be used.

The communications network 106 may provide communications services, such as packet-switched network services (e.g., Internet access, voice over Internet Protocol (VoIP), cloud/edge computing communication services), to devices connected to the communications network 106. An example of a communications network 106 is a cellular telephone network. For instance, the TCU 104 may access the cellular network via connection to one or more cellular towers. To facilitate the communications over the communications network 106, the TCU 104 may be associated with unique device identifiers (e.g., mobile device numbers (MDNs), Internet protocol (IP) addresses, etc.) to identify the communications of the TCU 104 on the communications network 106 as being associated with the vehicle 102.

The RSU 108 may be a device with processing capabilities and networking capabilities designed to be placed in proximity of the roadway 110 for use in communicating with vehicles 102. The roadway 110 may include one or more lanes. In the illustrated examine the roadway 110 includes two lanes, lane 1 and lane 2. In an example, the RSU 108 may include hardware configured to communicate over the broadcast peer-to-peer protocol (such as PC5), to facilitate C-V2X communications with the vehicles 102. The RSU 108 may also have wired or wireless backhaul capability to allow for communication with other elements of the communications network 106.

A GNSS 112 controller may be utilized by the vehicle 102 to provide autonomous geo-spatial positioning for the vehicle 102. As some examples, the GNSS 112 controller may allow the vehicle 102 to determine its position using one or more satellite navigation systems, such as global positioning system (GPS), globalnaya navigatsionnaya sputnikovaya sistema (GLONASS), Galileo, Beidou and/or others.

The vehicles 102 may include one or more sensors 114. These sensors 114 may include, in some examples, cameras configured to capture visible light and/or infrared imagery surrounding the vehicle 102. In another example, the sensors 114 may include light detection and ranging (LIDAR) and or radio detection and ranging (RADAR) sensors to supplement the camera imaging.

Lane-level matching, as described herein, consumes position, heading and speed sensor data from the sensors 114 and assigns a probability to each lane of the roadway 110. The lane probability may refer to the probability of the vehicle 102 being within the lane. Since the position data is provided at a specific rate, to account for maneuvers of the vehicle 102 in between any two consecutive position reports, the vehicle position is extrapolated using the speed and the heading information. This helps average lane matching confidence over several instances before receiving the next position report and increase confidence on lane matching. In addition, lane matching history may be used to enhance accuracy of lane probability estimation.

The lane-level matching algorithm may receive the following information as inputs:
 a. Position (Longitude, Latitude, Altitude) ([u, v, z]);
 b. Position uncertainty for each dimension ([$\sigma_u$, $\sigma_v$, $\sigma_z$]);
 c. Vehicle speed (V);
 d. Vehicle heading/yaw angle ($\vec{Vh}$); and
 e. Map information to identify the road lanes. The map information, in an example, may be defined to include sample points of the middle of each lane on the map. Note that this Map information may be provided either by the RSU 108 or by the communications network 106.

The lane-level matching algorithm may receive the following parameters:
 a. Time difference between any two consecutive position reports (T);
 b. Number of time samples between any two consecutive position reports (N); and
 c. Lane width (W).

The lane-level matching algorithm may provide the following outputs:
 a. Matched Lane identifier; and
 b. Matched Lane Probability.

Figure 2A:
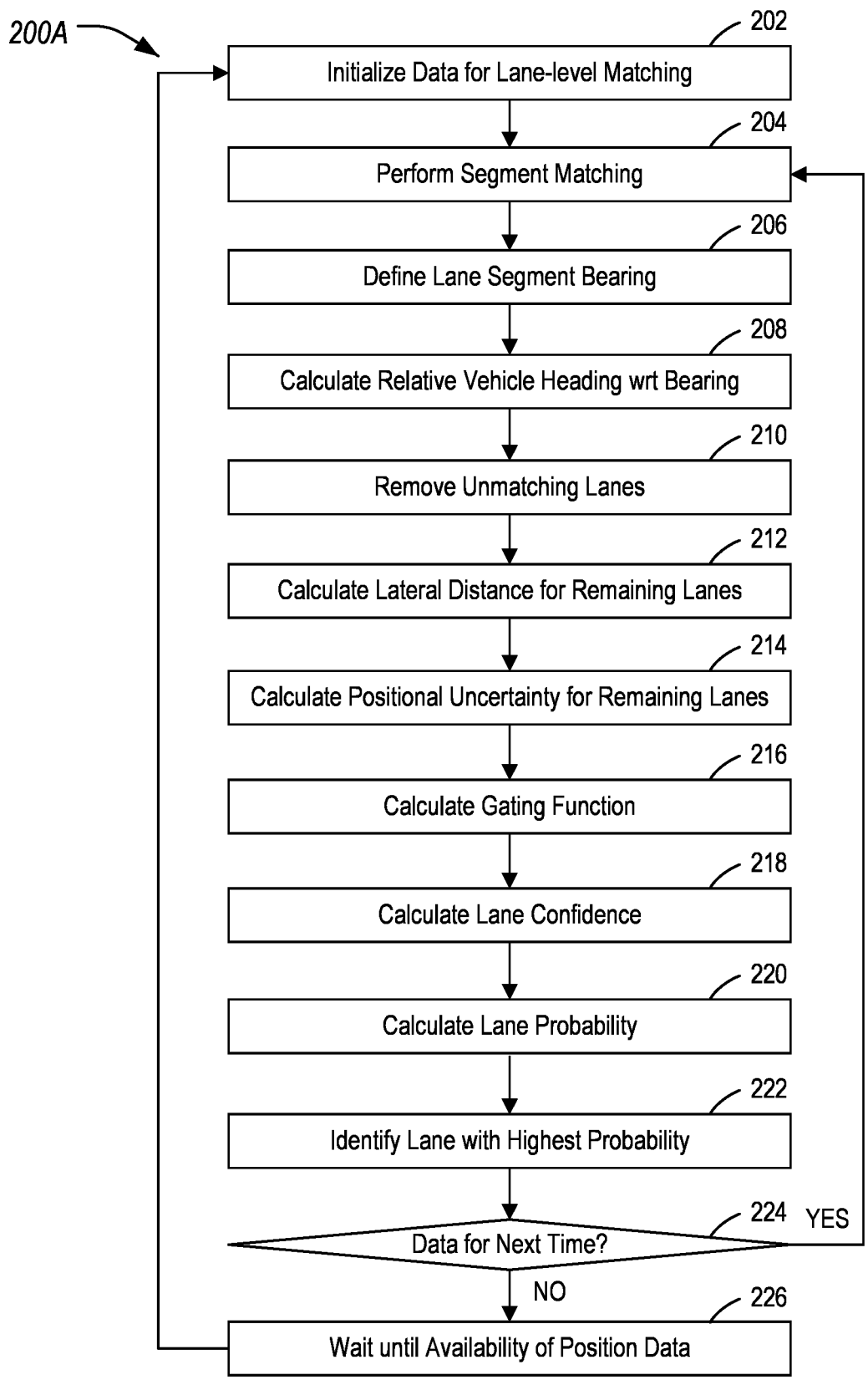
FIG. 2A illustrates an example process for performing a lane-level matching algorithm.

FIG. 2A illustrates an example process for performing a lane matching algorithm 200A. In an example the process may be performed by the TCU 104 of the vehicle 102.

At operation 202, the vehicle 102 initializes data for performing the lane-level matching. This may include, for example, setting t←0, where t represents time. Additionally, for all available lanes in the roadway 110, the vehicle 102 may initialize lane probability at time 0 as $p_i(0)=1/L$, i=1, 2, . . . , L, where L is the number of Lanes of the roadway 110 (e.g., with an initial equal probability). Further, for each lane, the vehicle 102 may define the lane segments as a line connects any two consecutive lane samples.

At operation 204, the vehicle 102 performs segment matching. For this operation, the vehicle 102 may utilize any of various available algorithms to perform segment matching. This matching may be based on the location and or heading of the vehicle 102, e.g., as determined via GNSS 112 or other data from the sensors 114, in relation to the geographic locations of the segments of the lanes of the roadway 110. The output of the segment matching is a set of all of the lanes of the roadway 110 which have a segment that is matched with the current location and/or direction of the vehicle 102. For instance, this may be all lanes that have a segment for which the projected position of the vehicle 102 onto the lane segment happens to be within the segment.

Figure 3:
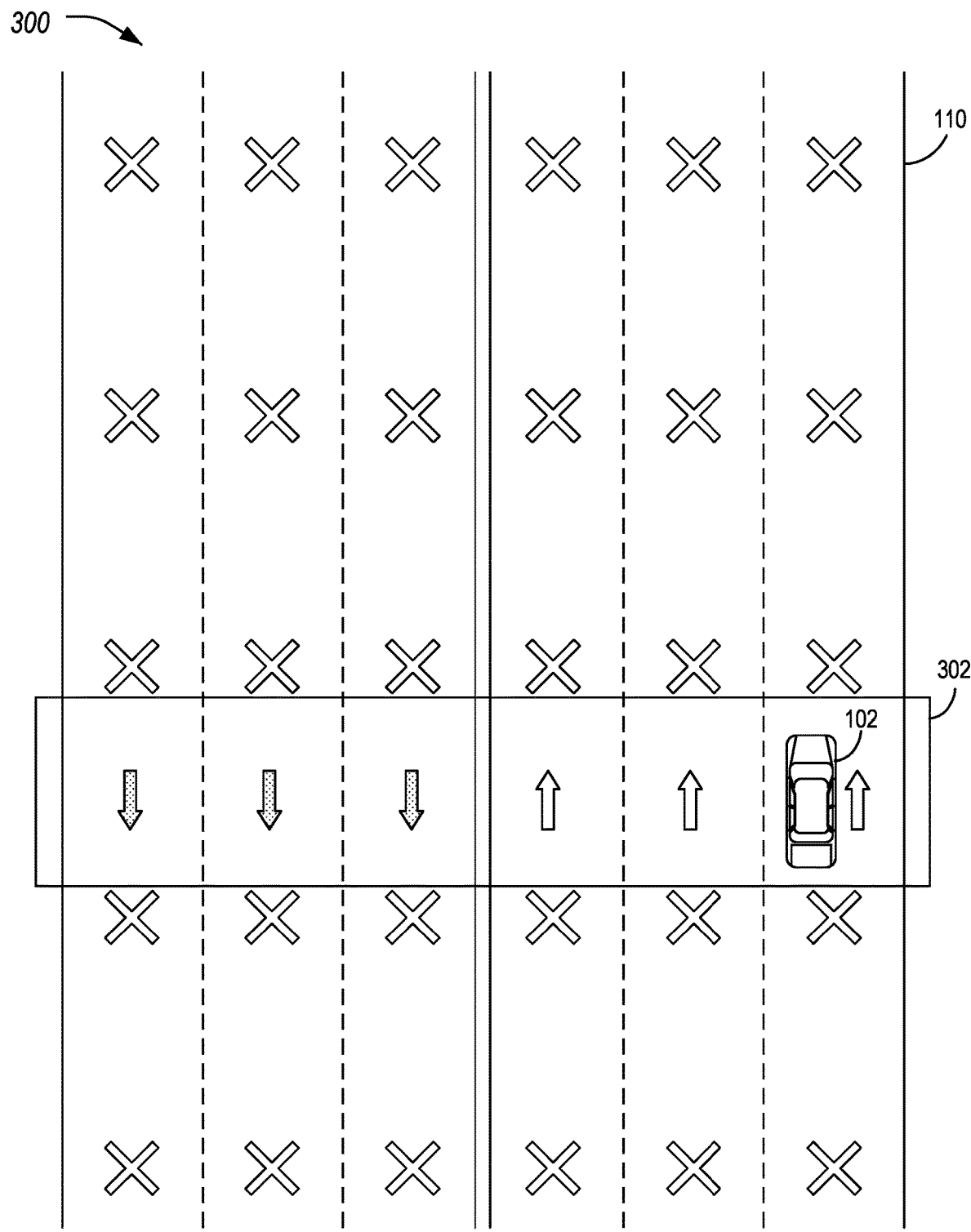
FIG. 3 illustrates an example simulated scenario for traversal of a roadway by a vehicle.

Referring to FIG. 3, an example 300 is illustrated of matched lane segments 302 for the location of the vehicle 102. In the example 300, segments of the roadway 110 are defined as segments between periodic geographical locations along the roadway 110. These geographical locations are noted in the example 300 as X's.

Referring back to FIG. 2A, and with continued reference to FIG. 3, at operation 206 the vehicle 102 defines a lane segment bearing. For each matched lane segment, the vehicle 102 may define the lane segment bearing as a two-dimensional vector in the direction of travel on roadway 110 surface through the lane segment. The vehicle 102 may further normalize this vector ($\vec{l_i}$ for lane i such that $\|\vec{l_i}\|=1$). The lane bearings for each of the matched lane segments 302 are shown by arrows in the respective road segment. These lane bearings indicate the direction of travel along the roadway 110.

At operation 208, the vehicle 102 calculates relative vehicle 102 heading with respect to the lane segment bearing. For example, for each lane with a matched lane segment, the vehicle 102 calculates a relative vehicle heading angle with respect to the lane bearing ($\varphi_i$).

At operation 210, the vehicle 102 removed unmatching lanes. In an example, the vehicle 102 may remove all the lanes with no matched segment or where $|\varphi_i|>\pi/2$ (e.g., the wrong way). For the road segments shown in FIG. 3, the lane segments with a pattern fill are those to be removed. For instance, the vehicle 102 may set $conf_i(t)=0$ for those removed lanes.

At operation 212, the vehicle 102 calculates a lateral distance for each of the remaining lanes. For instance, for each remaining lane i, the vehicle 102 may calculate a lateral distance as $$d_i = \sqrt{\|\vec{P}\|^2 - (\vec{P} \odot \vec{l_i})^2}$$

where:

$\vec{P}=(u-u_i, v-v_i)$, and ($u_i$, $v_i$) is longitude and latitude for the starting point of the matched segment in lane i.

Note that the starting point and the end point of the segment is defined based on direction of travel in the lane.

At operation 214, the vehicle 102 calculates a positional uncertainty for each of the remaining lanes. In one example, for each remaining lane i, the vehicle 102 may calculate the positional uncertainty in the orthogonal direction to the lane bearing as follows:

$$\sigma_i^2 = \vec{l_i^\perp}^T A \vec{l_i^\perp}$$

where:

$$A = \begin{bmatrix} \sigma_u^2 & 0 \\ 0 & \sigma_v^2 \end{bmatrix}, \text{ and } \vec{l_i^\perp} \text{ is such that } \vec{l_i^\perp} \odot \vec{l_i} = 0 \text{ and } \|\vec{l_i^\perp}\| = 1.$$

It should be noted that the complex number representation of $\vec{l}_t^\perp$ may be $$e^{j(\varphi_i \pm \frac{\pi}{2})}.$$

This is because for this formulation it is assumed that the position uncertainty is due to Gaussian noise in each direction.

In another example, a better estimation for $\sigma_i^2$ can be achieved if semi-major uncertainty ($\sigma_{s1}$), semi-minor uncertainty ($\sigma_{s2}$), and orientation for semi-major axis $$\left(\vec{s} = \begin{bmatrix} s_1 \\ s_2 \end{bmatrix}\right)$$

are available (instead of having $[\sigma_u, \sigma_v, \sigma_z]$). In this case, a matrix A may be calculated as:

$$A = \begin{bmatrix} \cos(\theta) & -\sin(\theta) \\ \sin(\theta) & \cos(\theta) \end{bmatrix} \begin{bmatrix} \sigma_{s1}^2 & 0 \\ 0 & \sigma_{s2}^2 \end{bmatrix} \begin{bmatrix} \cos(\theta) & \sin(\theta) \\ -\sin(\theta) & \cos(\theta) \end{bmatrix}$$

where:

$$\theta = \operatorname{atan}\left(\frac{s_2}{s_1}\right), \text{ and } A = \begin{bmatrix} \sigma_u^2 & \sigma_{uv} \\ \sigma_{uv} & \sigma_v^2 \end{bmatrix},$$

where $\sigma_{uv}$ is uncertainty covariance.

At operation 216, the vehicle 102 calculates a gating function. For instance, for each (remaining) lane i, the vehicle 102 may calculate the gating function as follows:

$$G_i[n] = \left(Q \frac{d_i + \frac{nT}{N}V\sin(\varphi_i) - \frac{W}{2}}{\sigma_i}\right) - Q\left(\frac{d_i + \frac{nT}{N}V\sin(\varphi_i) + \frac{W}{2}}{\sigma_i}\right)$$

for $n = 1, 2, \ldots, N$, where:

$$Q(x) = \int_x^\infty e^{-\frac{u^2}{2}} du$$

At operation 218, the vehicle 102 calculates a lane confidence. The lane confidence of the vehicle 102 may be based on an average confidence of the lane over the period of receiving consecutive position information. The time period between current position report to the next report may be divided to one or more time slots and the confidence values may be calculated for predicted position of the vehicle 102 over each time slot and then average confidence may be calculated. For example, for each (remaining) lane i, the lane confidence at time t may be calculated as follows:

$$\operatorname{conf}_i(t) = p_i(t-T)\left(\frac{1}{N}\sum_{n=0}^{N-1} G_i[n]\right),$$

where:
$p_i(t-T)$ is the probability of being matched to the lane i in the time for previous position report.

At operation 220, the vehicle 102 calculates a lane probability. In an example, for each lane i, the vehicle 102 may calculate the lane probability at time t as follows:

$$p_i(t) = \frac{\operatorname{conf}_i(t)}{\sum_{l=1}^{L} \operatorname{conf}_l(t)}$$

It should be noted that the lane probabilities may be calculated such that $\sum_{l=1}^{L} P_l(t) = 1$.

At operation 222, the vehicle 102 identifies a lane having the highest probability. In an example, the vehicle 102 may choose the lane with highest probability and report the lane id of that lane and the associated probability as output.

At operation 224, the vehicle 102 determines whether there is data for an additional time frame. If so, control returns to operation 204 to repeat operations for $t \leftarrow t+T$. If not control proceeds to operation 226.

At operation 226, the vehicle 102 stops lane matching process and waits until availability of data. Within waiting time there is no output for lane matching. Whenever the data is available, the controls return to 202 to reset lane matching process.

Figure 2B:
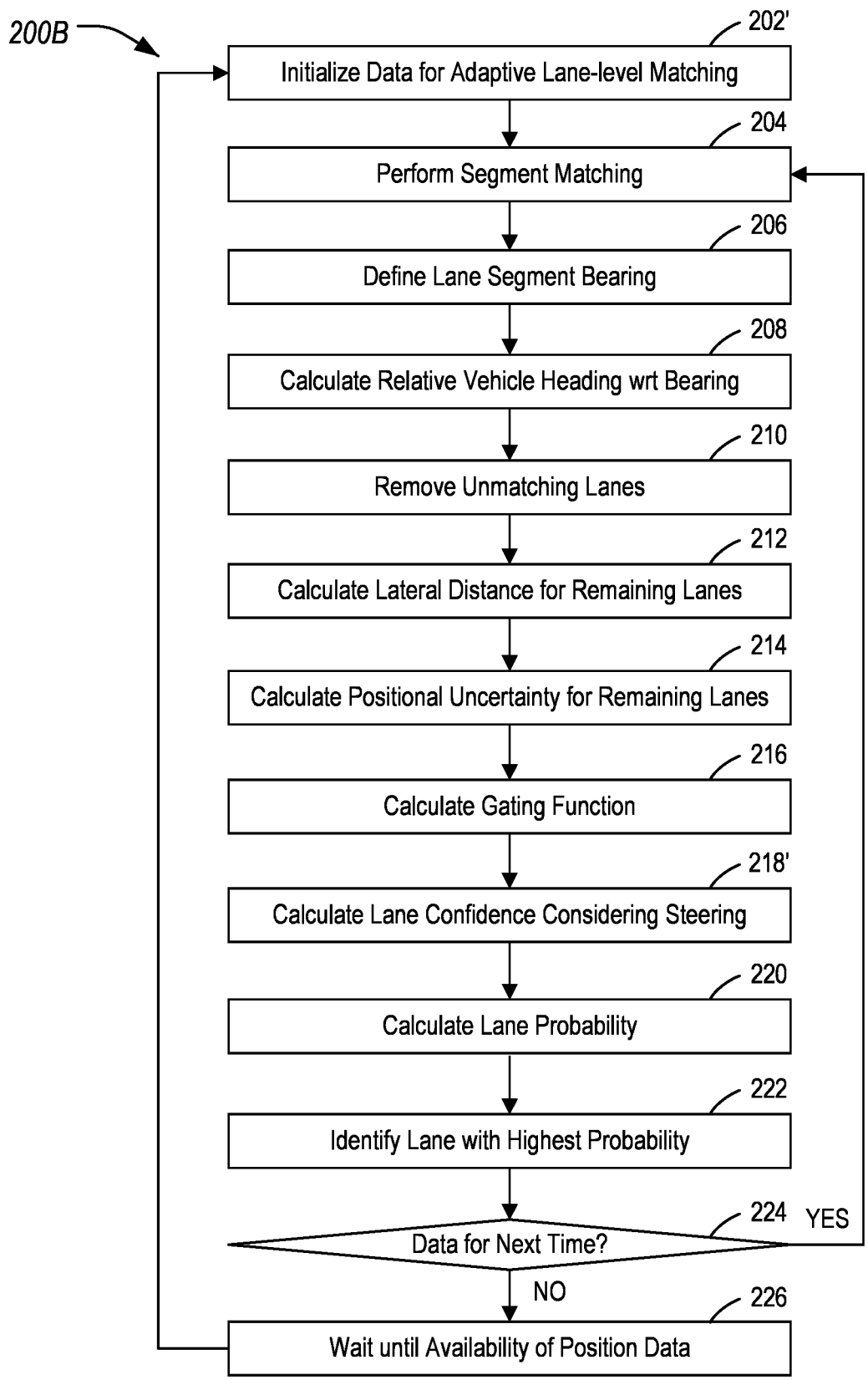
FIG. 2B illustrates an alternate example process for performing an adaptive lane-level matching algorithm.

FIG. 2B illustrates an alternate example process for performing an adaptive lane matching algorithm 200B. The adaptive lane matching algorithm 200B may share operations in common with the lane matching algorithm 200A. However, the adaptive lane matching algorithm 200B includes aspects with respect to the detection of the lane change and updating of the confidences accordingly. The lane change may be detected if the vehicle 102 consistently steers the wheels toward the left or right lane. After the left or right lane change is detected, the confidences are updated accordingly. This adaptive lane matching algorithm 200B may accordingly decrease the delay in lane matching due resulting from high uncertainty in the position report. For the adaptive lane matching, operations 202 and 218 of the lane matching algorithm 200A described above may be updated as follows to operations 202' and 218'. The other operations of the adaptive lane matching algorithm 200B may be consistent with discussed above with respect to the lane matching algorithms 200A and are not repeated here.

At operation 202', the vehicle 102 initializes data for performing the lane-level matching. For example, this may include the initializations discussed with respect to the operation 202 of the lane matching algorithm 200A.

Additionally, the vehicle 102 may set two counters for lane change detection $\operatorname{ctr} \leftarrow 0$ and $\operatorname{ctr2} \leftarrow 0$. The vehicle 102 may also define a counter threshold $\operatorname{ctr}_{TH}$. Also, the vehicle 102 may:
  set an average heading angle $\varphi_{avg} \leftarrow 0$,
  set a threshold for required heading angle for steering from one line to another line $\varphi_{TH}$, and
  set a confidence adjustment factor such that $0 < \Delta < 1$.

At operation 218', the vehicle 102 the vehicle 102 calculates a lane confidence utilizing a different approach from that of operation 218. Here, for each (remaining) lane i, the vehicle 102 may calculate the lane confidence at time t as follows:

$$conf_i(t) = p_i(t-T)\left(\frac{1}{N}\sum_{n=0}^{N-1} G_i[n]\right),$$

where:

$p_i(t-T)$ is the probability of being matched to the lane i in the previous position report.

The confidence calculation may be generalized in this adaptive algorithm as follows:

$$conf_i(t) = k_i(t)\left(\frac{1}{N}\sum_{n=0}^{N-1} G_i[n]\right),$$

where:

$$k_i(t) = \sum_{j=1}^{M} w_j p_i(t - jT)$$

such that:

M is memory depth, and wj's are weights which can be determined adaptively (or a fixed vector can be used).

Additional conditions may be applied as follows:

If ctr=0, then the vehicle 102 may set the value of ind as the index of the matched lane at t–T. The vehicle 102 may also identify the lanes located at left and right of the lane ind as $ind_{left}$, $ind_{right}$, respectively. Further, if $|\varphi_{ind}|>\varphi_{TH}$ then the vehicle 102 may set $\varphi_{avg} \leftarrow \varphi_{ind}$.

If $|(\varphi_{avg}|>\varphi_{TH}$, then the vehicle 102 may update as follows:

$$ctr \leftarrow ctr + 1, \text{ and}$$

$$\varphi_{avg} \leftarrow \frac{(ctr-1)\varphi_{avg} + \varphi_{ind}}{ctr}.$$

Figure 4:
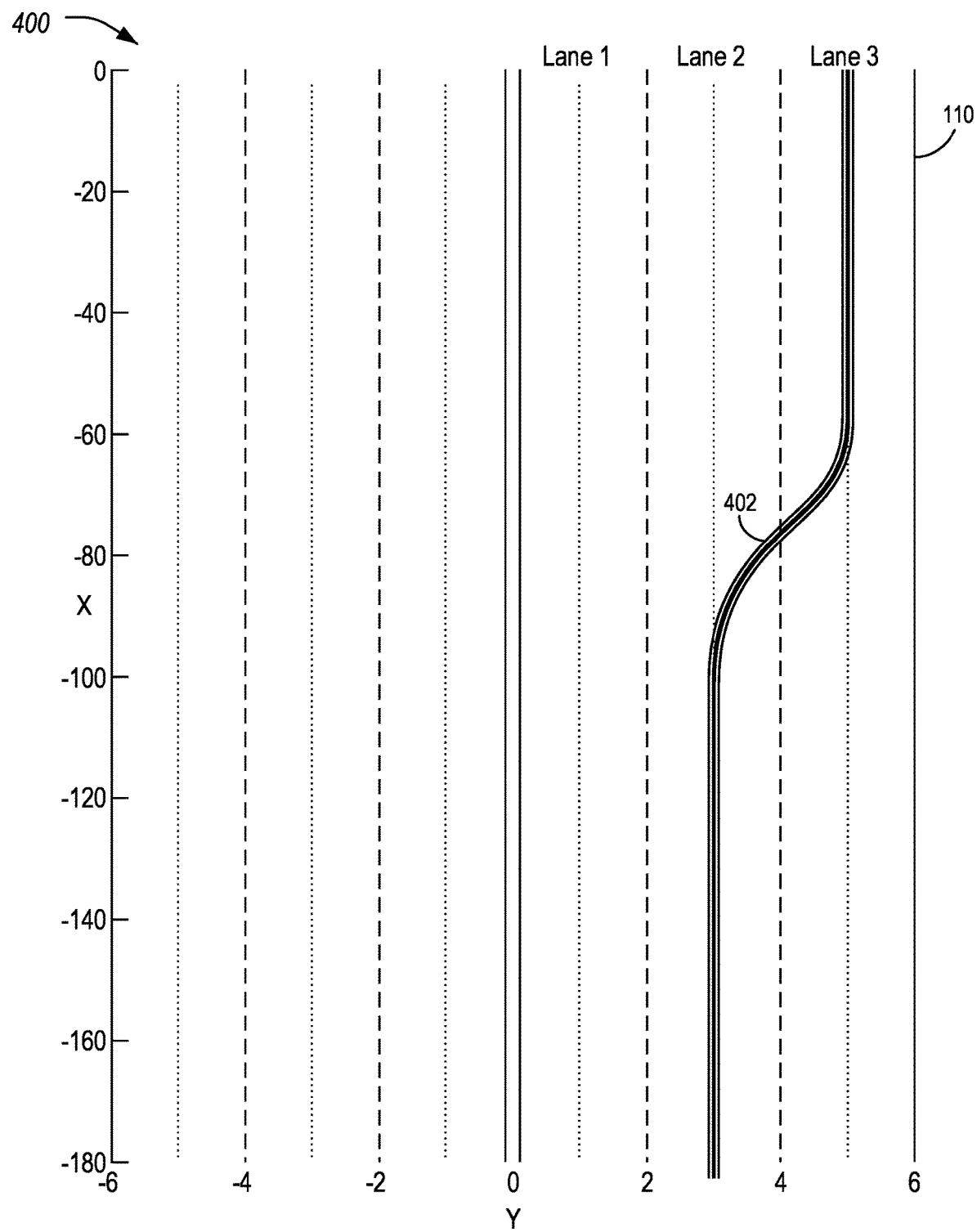
FIG. 4 illustrates an example detail of a vehicle trajectory along the roadway being traversed by the vehicle.

If $|V \sin(\varphi_{avg}) \times ctr \times T| \geq W$ and $ctr2 < ctr_{TH}$, then the vehicle 102 may perform the following:

Update $ctr2 \leftarrow ctr2+1$,

If $\varphi_{avg}>0$ then update the confidences as follows:
$conf_{ind_{left}}(t) \leftarrow conf_{ind_{left}}(t)-\Delta$, and
$conf_{ind_{right}}(t) \leftarrow conf_{ind_{right}}(t)+\Delta$ If $\varphi_{avg}<0$ then update the confidences as follows:
$conf_{ind_{left}}(t) \leftarrow conf_{ind_{left}}(t)+\Delta$, and
$conf_{ind_{right}}(t) \leftarrow conf_{ind_{right}}(t)-\Delta$ If $ctr2=ctr_{TH}$, update $ctr \leftarrow 0$ and $ctr2 \leftarrow 0$ FIG. 4 illustrates an example simulated scenario 400 for traversal of a roadway 110 by a vehicle 102. In the simulated scenario 400, the vehicle 102 moves from t=0 seconds to t=7 seconds in Lane 2 and then for three seconds steers toward Lane 3. From t=10 seconds, the vehicle 102 is completely located in Lane 3. A vehicle trajectory 402 is shown in the simulated scenario 400 illustrating path of the vehicle 102 along the lanes of the roadway 110. For this simulated scenario 400, it may be assumed that, for all the lanes, the position error in the lateral direction (y-direction) is a Gaussian noise with variance of σ=2. Also, for this simulation, the following parameters have been set: Δ=0.75, $ctr_{TH}$=10, memory depth M=1, and $w_1$=1.

Figure 5:
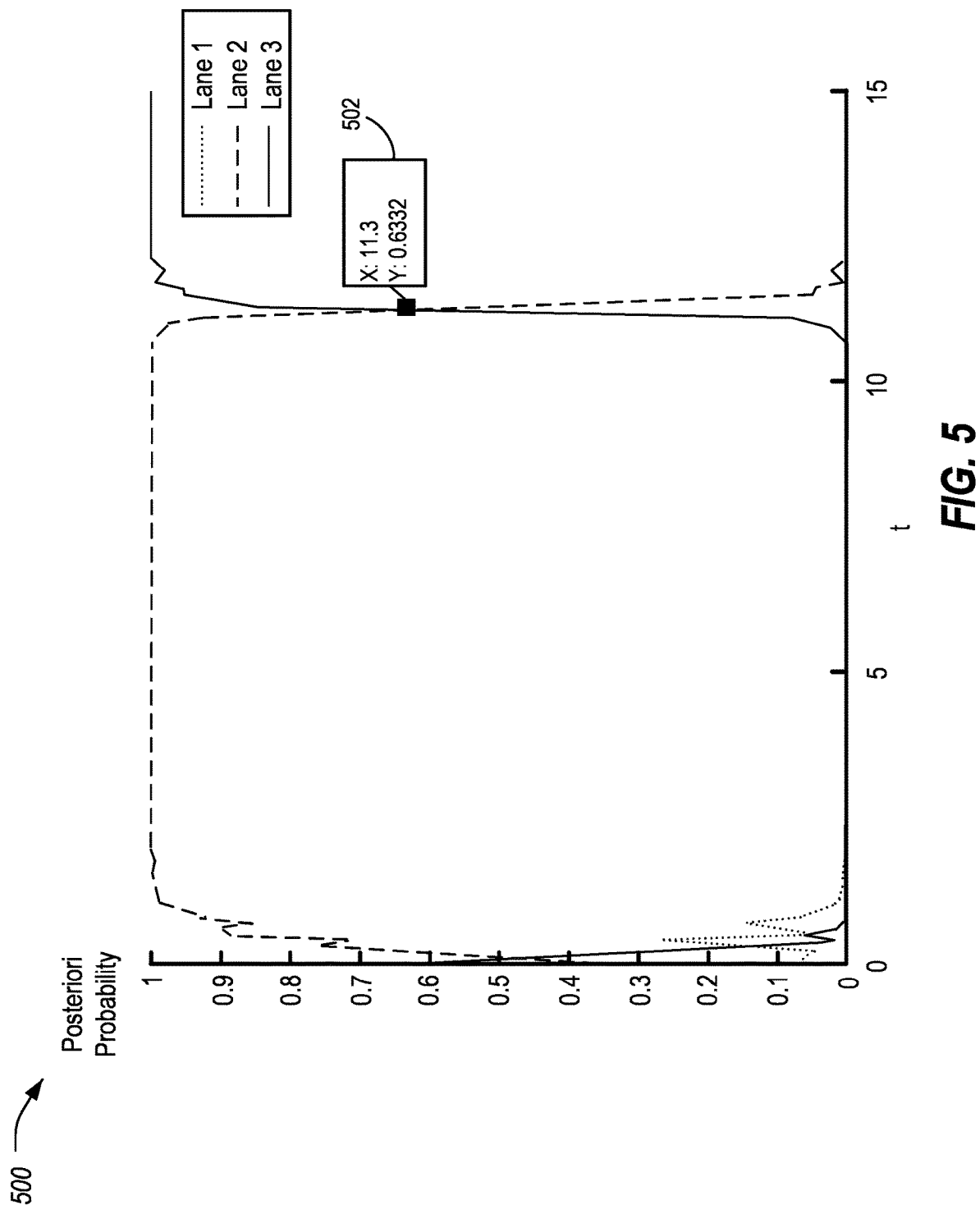
FIG. 5 illustrates simulated results of the lane matching algorithm using data from sensors of the vehicle performing the simulated scenario of FIG. 4.

FIG. 5 illustrates simulated results 500 of the lane matching algorithm 200A using simulated data from sensors 114 of the vehicle 102 performing the simulated scenario 400. As shown, the simulated results 500 are graphed over time for each of the lanes that are not deemed to be unmatching lanes. For this example, this includes the lanes marked in FIG. 4 as Lane 1, Lane 2, and Lane 3. The X-Axis of the simulated results 500 indicates the time t. The Y-Axis of the simulated results 500 indicates the probability of the vehicle 102 being in that lane as computed by the lane matching algorithm 200A. The probability for Lane 1 is graphed as a dotted line. The probability for Lane 2 is graphed as a dashed line. The probability for Lane 3 is graphed as a solid line.

In the simulated scenario 400, as noted above the vehicle 102 moves from Lane 2 to Lane 3 at approximately time index 10 seconds. The time at which the probability according to the lane matching algorithm 200A switches from Lane 2 to Lane 3 is indicated at crossing point 502 in the simulated result 500. As shown, the crossing point 502 occurs at time index 11.3 seconds, with a probability value of 0.6332.

Figure 6:
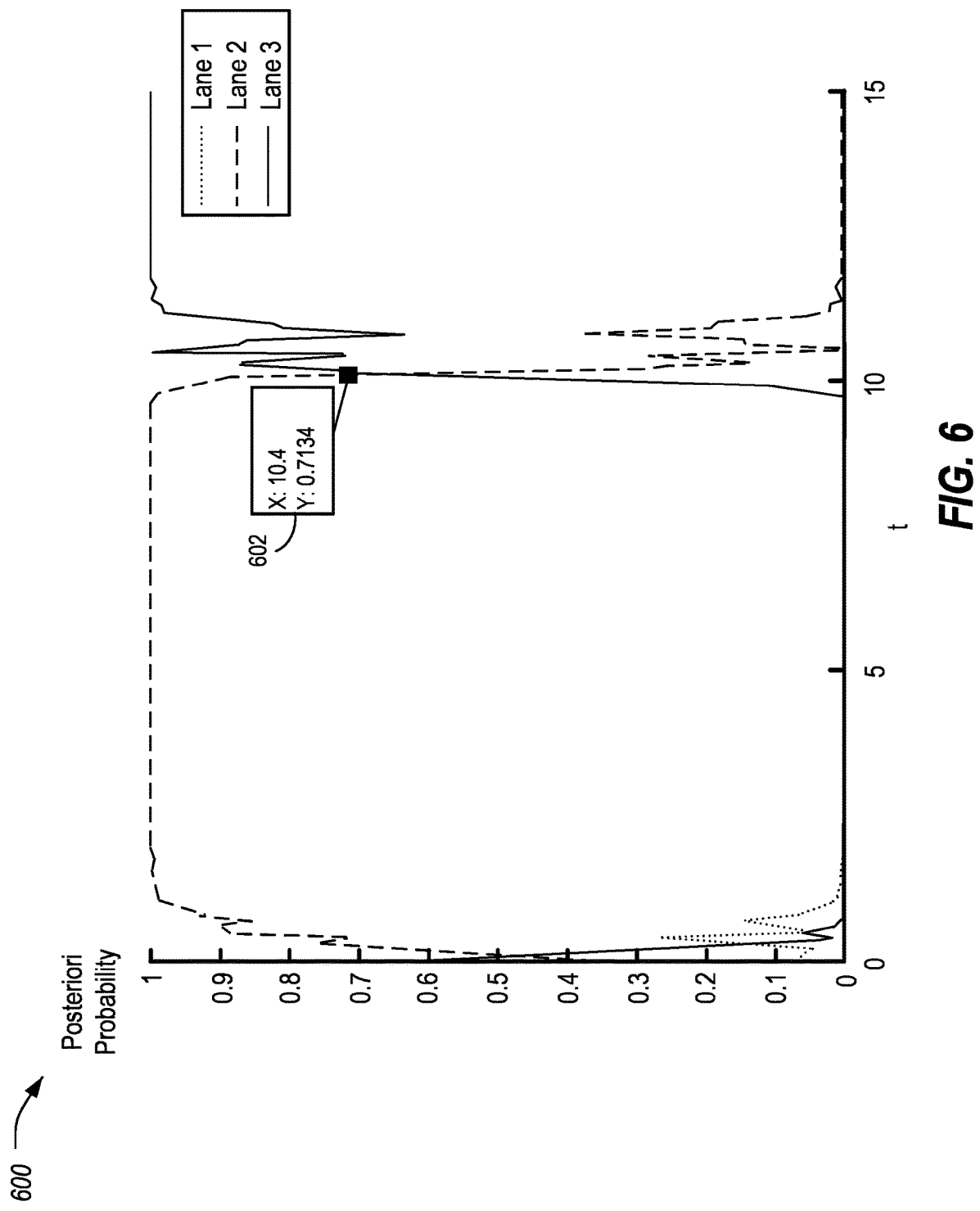
FIG. 6 illustrates simulated results for the adaptive lane matching algorithm using data from sensors of the vehicle performing the simulated scenario of FIG. 4.

FIG. 6 illustrates simulated results 600 for the adaptive lane matching algorithm 200B using simulated data from sensors 114 of the vehicle 102 performing the simulated scenario 400. The values for Lanes 1-3 are graphed in the simulated results 600 similar to as graphed in the simulated results 500. However, a crossing point 602 at which the adaptive lane matching algorithm 200B determines that Lane 3 is the most likely occurs almost a second sooner, at time index 10.4 seconds, with a probability value of 0.7134. Thus, it can be seen that the adaptive lane matching algorithm 200B is relatively faster than the lane matching algorithm 200A in determining the lane change time of the vehicle 102.

Figure 7:
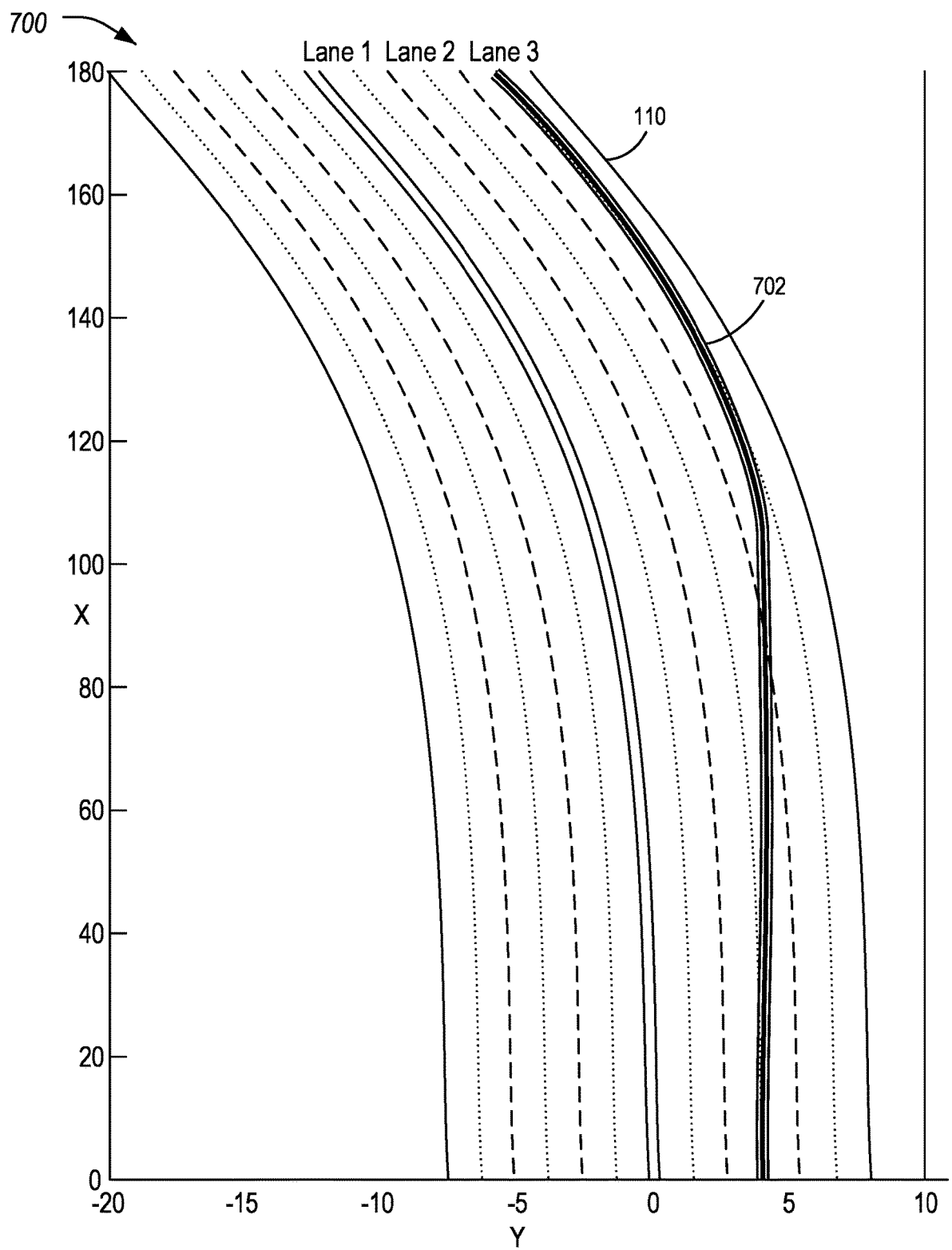
FIG. 7 illustrates an example detail of a vehicle trajectory along a curved roadway being traversed by the vehicle.

FIG. 7 illustrates an example alternate simulated scenario 700 for traversal of a roadway 110 by a vehicle 102. In the alternate simulated scenario 700, the roadway 110 is curved, as opposed to the straightaway shown in the simulated scenario 400. In the alternate simulated scenario 700, the vehicle 102 moves from t=0 seconds to t=7 seconds from Lane 2 to Lane 3, and after that, fully locates in and continues along Lane 3. This is shown as vehicle trajectory 702. For this simulation, it is assumed that, for all the lanes of the roadway 110, the position errors in the longitude and latitude direction are Gaussian noises with the variance of σ=2. Also, for this simulation, the following parameters have been set: Δ=0.5, $ctr_{TH}$=10, memory depth M=1, and $w_1$=1.

Figure 8:
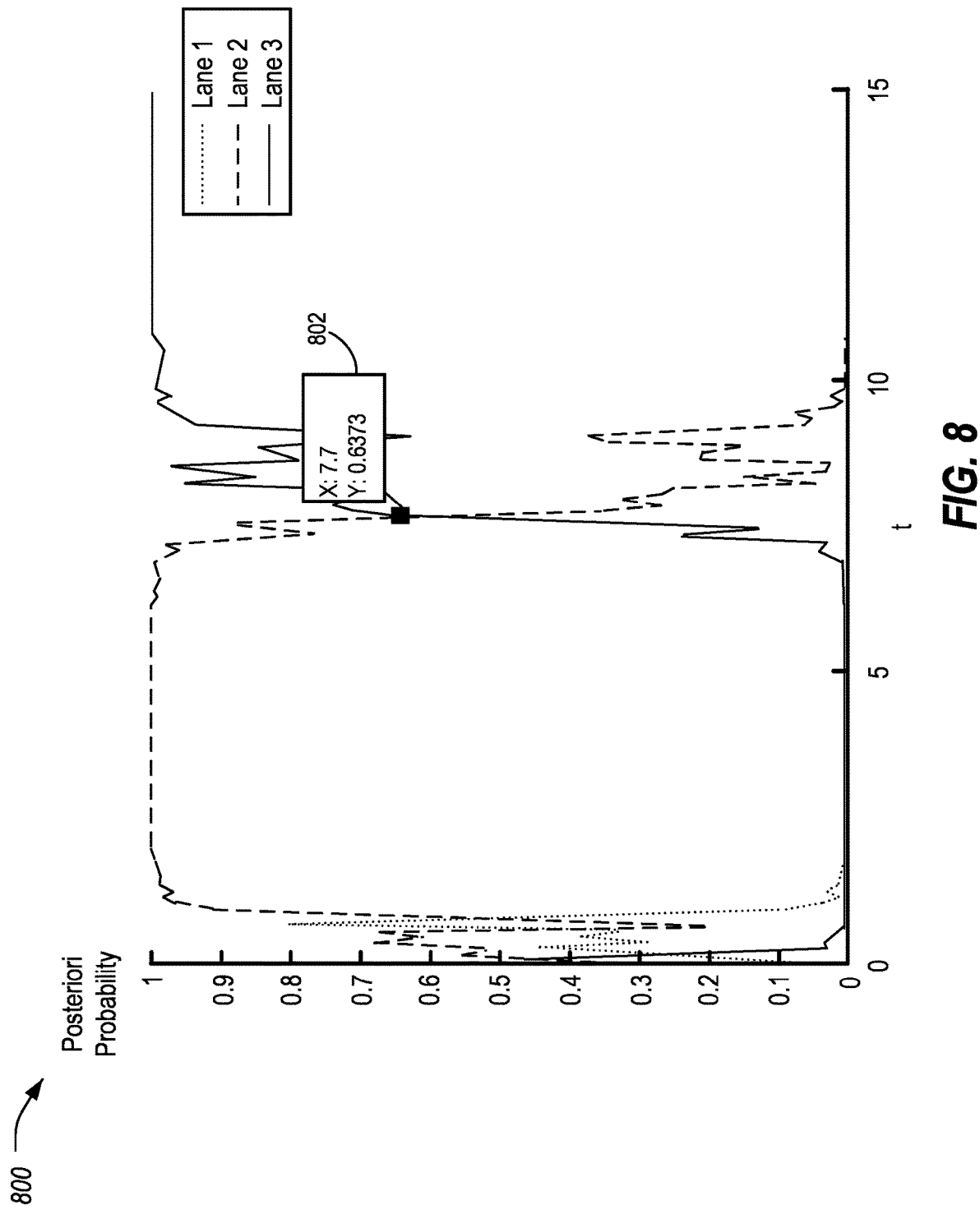
FIG. 8 illustrates simulated results of the lane matching algorithm using simulated data from sensors of the vehicle performing the alternate simulated scenario of FIG. 7.
Figure 9:
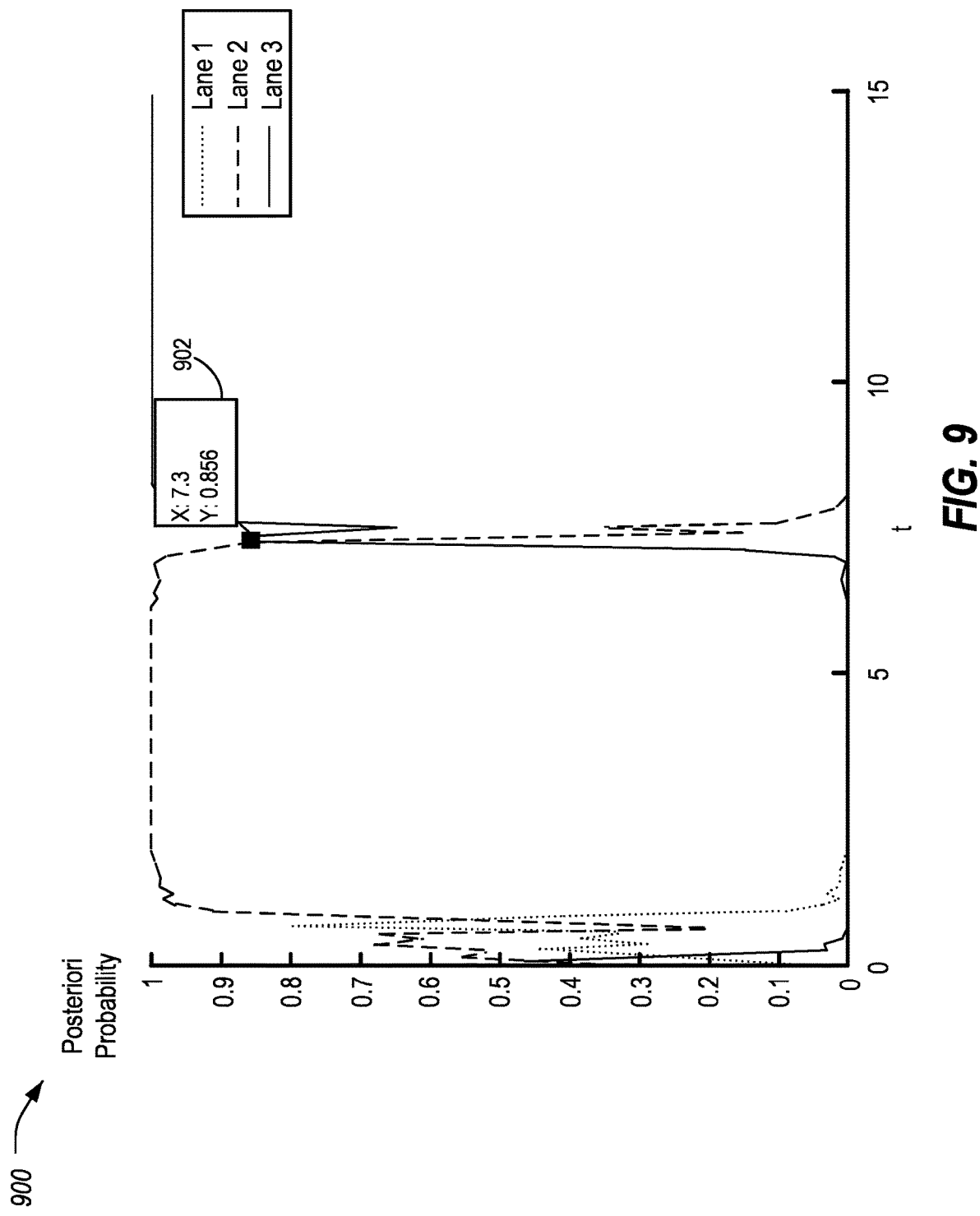
FIG. 9 illustrates simulated results of the adaptive lane matching algorithm using simulated data from sensors of the vehicle performing the alternate simulated scenario of FIG. 7.

FIG. 8 illustrates simulated results 800 of the lane matching algorithm 200A using simulated data from sensors 114 of the vehicle 102 performing the alternate simulated scenario 700. FIG. 9 illustrates simulated results 900 of the adaptive lane matching algorithm 200B using simulated data from sensors 114 of the vehicle 102 performing the alternate simulated scenario 700. The simulated results 800 and simulated results 900 are graphed similar to the simulated results 500 and simulated results 600.

In the simulated results 800, it can be seen that a crossing point 802 at which the lane matching algorithm 200A determines Lane 3 to be the most likely occurs at time index 7.7 seconds, with a probability value of 0.6373. In the simulated results 900, it can be seen that a crossing point 902 at which the adaptive lane matching algorithm 200B determines Lane 3 to be the most likely occurs at time index 7.3 seconds, with a probability value of 0.856. Thus, here again, the adaptive lane matching algorithm 200B identifies the lane change well in advance of the lane matching algorithm 200A.

The lane matching algorithm 200A and adaptive lane matching algorithm 200B may have various useful applications.

One of these applications may be Traffic Light Classification (TLC). TLC is one of the most useful functionalities for cellular vehicle-to-infrastructure (CV2I) communication, in which MAP data and signal phase and time (SPaT) data are provided by infrastructure to the vehicle 102. The MAP data may include information relating to road sample points for each lane, while the SPaT data may include the information for the surrounding intersections, as well as their signal phases and timing information. For the most accurate use of TLC functionality, lane level matching may be used. By matching the vehicle location to one the lanes, the vehicle 102 may be matched with corresponding traffic light signals and signal timing. The disclosed algorithms may enhance the TLC, by using the vehicle lane matching history and its heading and speed for improved lane matching. Using the approaches in this disclosure may make the TLC algorithm more resilient to positioning uncertainty, since it can be seen as a noise filtration process by using lane matching history.

Another of these applications may be localization. In localization, a high-resolution map is available for the vehicle 102. Using lane-level matching the vehicle 102 may be localized within the lanes using noisy position data and vehicle speed and heading. The lane-level matching approaches in this disclosure may confine the lateral position of the vehicle 102 to one of the lanes in the road to improve the uncertainty of lateral position within the width of the lane. Without using the lane matching algorithm 200A or the adaptive lane matching algorithm 200B, a localization algorithm may only bound the lateral position based on lateral noise level. Using the lane matching algorithm 200A or the adaptive lane matching algorithm 200B may accordingly reduce the lateral position error by using the lane matching history as a noise filtration process.

Figure 10:
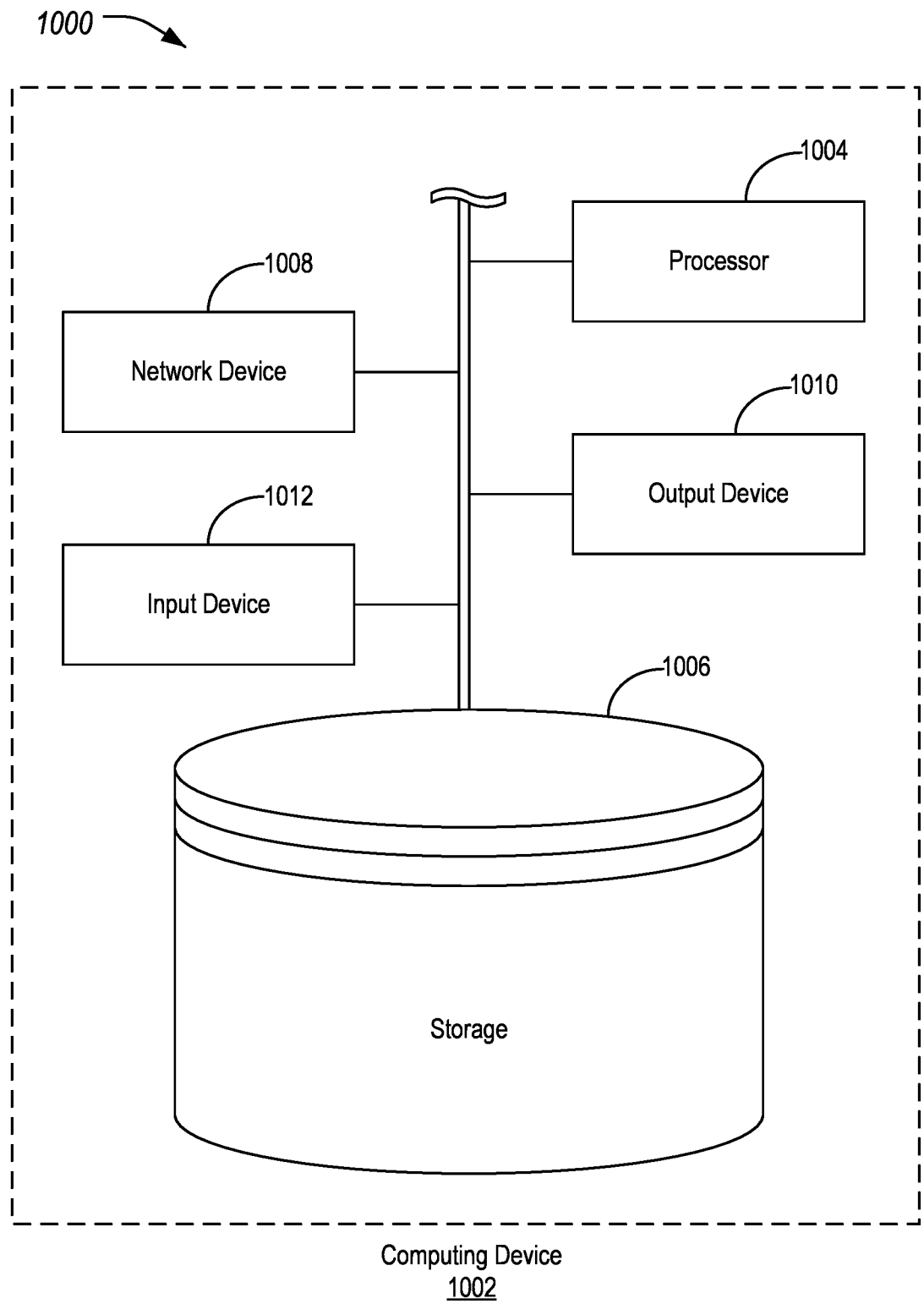
FIG. 10 illustrates an example computing device for use in lane-level matching applications.

FIG. 10 illustrates an example 1000 of a computing device 1002. Referring to FIG. 10, and with reference to FIGS. 1-9, the TCU 104 of the vehicle 102 may be an example of such computing devices 1002. As shown, the computing device 1002 may include a processor 1004 that is operatively connected to a storage 1006, a network device 1008, an output device 1010, and an input device 1012. It should be noted that this is merely an example, and computing devices 1002 with more, fewer, or different components may be used.

The processor 1004 may include one or more integrated circuits that implement the functionality of a central processing unit (CPU) and/or graphics processing unit (GPU). In some examples, the processors 1004 are a system on a chip (SoC) that integrates the functionality of the CPU and GPU. The SoC may, optionally, include other components such as, for example, the storage 1006 and the network device 1008 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1004 executes stored program instructions that are retrieved from the storage 1006. The stored program instructions, accordingly, include software that controls the operation of the processors 1004 to perform the operations described herein. The storage 1006 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1010. The output device 1010 may include a graphical or visual display device, such as an electronic display screen, projector, printer, or any other suitable device that reproduces a graphical display. As another example, the output device 1010 may include an audio device, such as a loudspeaker or headphone. As yet a further example, the output device 1010 may include a tactile device, such as a mechanically raiseable device that may, in an example, be configured to display braille or another physical output that may be touched to provide information to a user.

The input device 1012 may include any of various devices that enable the computing device 1002 to receive control input from users. Examples of suitable input devices that receive human interface inputs may include keyboards, mice, trackballs, touchscreens, voice input devices, graphics tablets, and the like.

The network devices 1008 may each include any of various devices that enable the computing devices 1002 to send and/or receive data from external devices over networks (such as the communications network 106). Examples of suitable network devices 1008 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for lane-level matching, comprising:
a computing device programmed to:
calculate, for a time index of a time slot of a period of receiving consecutive vehicle position information, using data from sensors of a vehicle, a lateral distance of the vehicle to each of a plurality of lanes of a roadway;

for each lane of the plurality of lanes:

calculate a positional uncertainty of the vehicle in an orthogonal direction to a lane bearing of the lane;

calculate a lane confidence based on an average of confidence values of the lane over the period of receiving the consecutive position information; and calculate a lane probability based on the lane confidence; and identify, for the time index, which of the lanes has a highest probability as being the lane to which the vehicle position, location, and/or direction is matched; and navigate the vehicle along the plurality of lanes, using the lane to which the vehicle is matched.

2. The system of claim 1, wherein the computing device is further programmed to:

divide a time period between a current position report to a next report into one or more time slots;

calculate the confidence values for predicted position of the vehicle over each time slot; and compute the lane confidence as an average of the confidence values of the time slots.

3. The system of claim 1, wherein the computing device is further programmed to estimate the positional uncertainty of the vehicle in view of estimated Gaussian noise in each orthogonal direction.

4. The system of claim 1, wherein the computing device is further programmed to utilize steering direction of the vehicle as an input to the lane confidence of the vehicle as a relative vehicle heading angle with respect to the lane bearing.

5. The system of claim 1, wherein the computing device is further programmed to define each lane as lines centered within the lanes connecting sample points of the middle of each lane.

6. The system of claim 1, wherein a sum of the lane probability for each of the lanes at the time index adds up to the entire sample space.

7. The system of claim 1, wherein the computing device is further programmed to set the lane confidence to zero for any of the lanes having greater than a predefined maximum threshold angle from a heading angle of the vehicle.

8. The system of claim 1, wherein the computing device is programmed to initialize the lane probability for each of the lanes as being equally likely.

9. A method for lane-level matching, comprising:

calculating, for a time index of a time slot of a period of receiving consecutive vehicle position information, using data from sensors of a vehicle, a lateral distance of the vehicle to each of a plurality of lanes of a roadway;

for each lane of the plurality of lanes:

calculating a positional uncertainty of the vehicle in an orthogonal direction to a lane bearing of the lane;

calculating a lane confidence based on an average of confidence values of the lane over the period of receiving consecutive position information; and calculating a lane probability based on the lane confidence; and identifying, for the time index, which of the lanes has a highest probability as being the lane to which the vehicle position, location, and/or direction is matched; and navigating the vehicle along the plurality of lanes, using the lane to which the vehicle is matched.

10. The method of claim 9, further comprising:

dividing a time period between a current position report to a next report into one or more time slots;

calculating the confidence values for predicted position of the vehicle over each time slot; and computing the lane confidence as an average of the confidence values of the time slots.

11. The method of claim 9, further comprising estimating the positional uncertainty of the vehicle in view of estimated Gaussian noise in each orthogonal direction.

12. The method of claim 9, further comprising utilizing steering direction of the vehicle as an input to the lane confidence of the vehicle as a relative vehicle heading angle with respect to the lane bearing.

13. The method of claim 9, further comprising defining each lane as lines centered within the lanes connecting sample points of the middle of each lane.

14. The method of claim 9, wherein a sum of the lane probability for each of the lanes at the time index adds up to the entire sample space.

15. The method of claim 9, further comprising setting the lane confidence to zero for any of the lanes having greater than a predefined maximum threshold angle from a heading angle of the vehicle.

16. The method of claim 9, further comprising initializing the lane probability for each of the lanes as being equally likely.

17. A non-transitory computer-readable medium comprising instructions for lane-level matching that, when executed by a computing device, cause the computing device to perform operations including to:

calculate, for a time index of a time slot of a period of receiving consecutive vehicle position information, using data from sensors of a vehicle, a lateral distance of the vehicle to each of a plurality of lanes of a roadway;

for each lane of the plurality of lanes:

calculate a positional uncertainty of the vehicle in an orthogonal direction to a lane bearing of the lane;

calculate a lane confidence based on an average of confidence values of the lane over the period of receiving consecutive position information; and calculate a lane probability based on the lane confidence; and identify, for the time index, which of the lanes has a highest probability as being the lane to which the vehicle position, location, and/or direction is matched; and navigate the vehicle along the plurality of lanes, using the lane to which the vehicle is matched.

18. The non-transitory computer-readable medium of claim 17, further comprising instructions that, when executed by the computing device, cause the computing device to perform operations including to:

divide a time period between a current position report to a next report into one or more time slots;

calculate the confidence values for predicted position of the vehicle over each time slot; and compute the lane confidence as an average of the confidence values of the time slots.

19. The non-transitory computer-readable medium of claim 17, further comprising instructions that, when executed by the computing device, cause the computing device to perform operations including to estimate the positional uncertainty of the vehicle in view of estimated Gaussian noise in each orthogonal direction.

20. The non-transitory computer-readable medium of claim 17, further comprising instructions that, when executed by the computing device, cause the computing device to perform operations including to utilize steering direction of the vehicle as an input to the lane confidence of the vehicle as a relative vehicle heading angle with respect to the lane bearing.

21. The non-transitory computer-readable medium of claim 17, further comprising instructions that, when executed by the computing device, cause the computing device to perform operations including to define each lane as lines centered within the lanes connecting sample points of the middle of each lane.

22. The non-transitory computer-readable medium of claim 17, wherein a sum of the lane probability for each of the lanes at the time index adds up to the entire sample space, and further comprising instructions that, when executed by the computing device, cause the computing device to perform operations including to initialize the lane probability for each of the lanes as being equally likely.

23. The non-transitory computer-readable medium of claim 17, further comprising instructions that, when executed by the computing device, cause the computing device to perform operations including to set the lane confidence to zero for any of the lanes having greater than a predefined maximum threshold angle from a heading angle of the vehicle.

24. The system of claim 1, wherein the computing device is further programmed to use the lane to which the vehicle is matched for Traffic Light Classification (TLC) by matching the vehicle to traffic light signals and signal timing provided to the vehicle.

25. The system of claim 1, wherein the computing device is further programmed to use the lane to which the vehicle is matched for advanced driver assistant system (ADAS) and/or for autonomous driving.

26. The system of claim 1, wherein the computing device is further programmed to use the lane to which the vehicle is matched for lane-level matching the vehicle to high-resolution map data.

* * * * *